United States Patent
Molenda et al.

(10) Patent No.: US 11,604,166 B2
(45) Date of Patent: Mar. 14, 2023

(54) METHOD FOR THE CONTACTLESS DETERMINATION OF A MECHANICAL-TECHNOLOGICAL CHARACTERISTIC VARIABLE OF FERROMAGNETIC METALS, AND ALSO APPARATUS FOR SAID METHOD

(71) Applicant: ROSEN Swiss AG, Stans (CH)

(72) Inventors: Daniel Molenda, Lingen (DE); Werner Thale, Wallenhorst (DE); Bernhard Reining, Emsbüren (DE); Michael Rapp, Lingen (DE)

(73) Assignee: ROSEN Swiss AG

( * ) Notice: Subject to any disclaimer, the term of this patent is extended or adjusted under 35 U.S.C. 154(b) by 0 days.

(21) Appl. No.: 15/023,104

(22) PCT Filed: Sep. 16, 2014

(86) PCT No.: PCT/EP2014/002490
§ 371 (c)(1),
(2) Date: Mar. 18, 2016

(87) PCT Pub. No.: WO2015/039742
PCT Pub. Date: Mar. 26, 2015

(65) Prior Publication Data
US 2016/0231277 A1    Aug. 11, 2016

(30) Foreign Application Priority Data
Sep. 20, 2013    (DE) .......................... 102013015566.5

(51) Int. Cl.
*G01N 27/80*    (2006.01)
*G01N 27/72*    (2006.01)
(Continued)

(52) U.S. Cl.
CPC ........... *G01N 27/80* (2013.01); *G01N 27/025* (2013.01); *G01N 27/72* (2013.01); *G01N 27/9006* (2013.01)

(58) Field of Classification Search
CPC .......... G01N 3/60; G01N 27/00; G01N 27/80; G01N 27/82; G01N 27/90; G01N 27/02;
(Continued)

(56) References Cited

U.S. PATENT DOCUMENTS

| | | | |
|---|---|---|---|
| 4,855,676 A | 8/1989 | Cecco et al. | |
| 5,006,800 A * | 4/1991 | Hedengren | G01N 27/82 324/233 |

(Continued)

FOREIGN PATENT DOCUMENTS

EP    0394158 A1    10/1990

OTHER PUBLICATIONS

Javier García-Martín et al.; Non-Destructive Techniques Based on Eddy Current Testing, Jan. 2011.*

(Continued)

*Primary Examiner* — Son T Le
(74) *Attorney, Agent, or Firm* — Husch Blackwell LLP

(57) ABSTRACT

A method is disclosed for determining a mechanical-technological characteristic variable of ferromagnetic metals, preferably ferromagnetic steels, and in particular fine-grained steels, which are used in pipelines. A magnetization apparatus, which has at least one permanent magnet or solenoid, magnetizes the metal which is to be determined, and a sensor apparatus comprising a transmission coil generates a magnetic field which interacts with the magnetic field which is generated by the magnetization apparatus in the metal, and which generates an eddy current. The eddy current is generated in the magnetically at least substantially saturated metal, and the eddy current is measured by an eddy (Continued)

current sensor of the sensor apparatus. A magnetic field strength sensor measures the magnetic field of the metal at least close to the surface, and the electrical conductivity or the specific electrical resistance of the metal is ascertained from the data from the eddy current sensor on the basis of reference data by means of an evaluation apparatus. The characteristic variable of the metal is derived from the conductivity or the resistance, and also an inspection gauge for carrying out a method of this kind.

6 Claims, 11 Drawing Sheets

(51) Int. Cl.
  *G01N 27/02* (2006.01)
  *G01N 27/90* (2021.01)
(58) Field of Classification Search
  CPC .. G01N 27/9006; G01N 27/025; G01N 27/72; G01N 27/9033; G01N 29/2412; G01N 2011/0086
  See application file for complete search history.

(56) References Cited

U.S. PATENT DOCUMENTS

| | | | | |
|---|---|---|---|---|
| 6,067,846 | A * | 5/2000 | Hill | G01N 3/44 73/82 |
| 6,847,207 | B1 * | 1/2005 | Veach | F16L 55/26 324/220 |
| 2003/0020469 | A1 | 1/2003 | Katragadda et al. | |
| 2004/0075452 | A1 * | 4/2004 | Hrubes | G01B 5/0014 324/721 |
| 2006/0109003 | A1 * | 5/2006 | Redko | G01N 27/9026 324/240 |
| 2011/0167914 | A1 | 7/2011 | Sutherland | |
| 2013/0009632 | A1 * | 1/2013 | Yamamoto | G01N 27/9046 324/222 |
| 2013/0234701 | A2 * | 9/2013 | Boenisch | G01N 27/82 324/239 |

OTHER PUBLICATIONS

M. P. Perkins, M. M. Ong, C. G. Brown, R. D. Speer; Analysis of Conductor Impedances Accounting for Skin Effect and Nonlinear Permeability; 18th IEEE International Pulsed Power Conference Chicago, IL, United States Jun. 19, 2011 through Jun. 23, 2011.*

Blitz, Jack. "Nondestructive testing using electromagnetic instrumentation." Journal of Physics E: Scientific Instruments 16.12 (1983): 1135-1141.

García-Martín, Javier, Jaime Gómez-Gil, and Ernesto Vázquez-Sánchez. "Non-destructive techniques based on eddy current testing." Sensors 11.3 (2011): 2525-2565.

Bowler, Nicola, and Yongqiang Huang. "Electrical conductivity measurement of metal plates using broadband eddy-current and four-point methods." Measurement Science and Technology 16.11 (2005): 2193.

Mathias Stolzenberg et al: "Special: Mess-und Prüftechnik", Retrieved from the Internet: URL:http://www.emg-automation.com/fileadming-an-Flachprodukten.pdf [retrieved on Mar. 16, 2016].

* cited by examiner

METHOD FOR THE CONTACTLESS DETERMINATION OF A MECHANICAL-TECHNOLOGICAL CHARACTERISTIC VARIABLE OF FERROMAGNETIC METALS, AND ALSO APPARATUS FOR SAID METHOD

CROSS REFERENCE

This application is a national phase application of PCT/EP2014/002490 filed Sep. 16, 2014, which itself claims priority to German Application No. 10 2013 015566.5, filed Sep. 20, 2013, the entirety of both of which are hereby incorporated by reference.

FIELD OF THE INVENTION

The invention relates to a method for determining mechanical-technological characteristic variables of ferromagnetic metals, preferably ferromagnetic steels, and in particular fine-grained steels, which are used in pipelines, wherein a magnetization apparatus, which has at least one permanent magnet or solenoid, magnetizes the material which is to be determined, and a sensor apparatus comprising a transmission coil generates an, in particular varying, magnet field which interacts with the magnetic field which is generated by the magnetization apparatus in the metal, and which leads to an eddy current being formed. The eddy current is therefore generated by the transmission coil in the metal which is magnetized by the magnetization apparatus. The invention further relates to an inspection gauge for pipeline pipes, having at least one magnetization apparatus which is in the form of a magnet yoke and having a sensor apparatus, which has a transmission coil, comprising an eddy current sensor.

BACKGROUND OF THE INVENTION

It is known from the prior art (article "Material characterization and flat steel enhances process control", Stahl and Eisen [Steel and Iron], 2012, edition no, 7, pages 80-90) to seek electromagnetic methods for identifying mechanical-technological characteristic variables which apply to properties of the hysteresis curve of the mater al which is to be examined. During examination of the material, steel plates are guided past a sensor apparatus in a controlled manner, for example. For use within a pipeline, in particular an oil pipeline which is decades old, in which the sensor apparatus is located on a passively or actively moving inspection gauge and in which interfering influences may occur during inspection on account of the large number of interference sources such as remanent magnetization, defects or the like, the use of a method of this kind is not suitable or at least difficult to realize and control in respect of measurement.

SUMMARY OF THE INVENTION

It is therefore an object of the present invention to allow the measurement of mechanical-technological characteristic variables, in particular in pipelines. Accordingly, it is also an object of the present invention to provide an associated inspection device.

The invention provides a method in which the eddy current is generated in a magnetically at least substantially saturated metal, and the eddy current is measured by an eddy current sensor of the sensor apparatus, wherein a magnetic field strength sensor measures the magnetic field of the metal at least close to the surface, and wherein the electrical conductivity or the specific electrical resistance of the metal is ascertained from the data from the eddy current sensor on the basis of reference data by means of an evaluation apparatus, and also the characteristic variable of the metal is derived from the conductivity or the resistance.

The principle is therefore initially based on the measurement of the electrical conductivity or of the specific electrical resistance of the material by means of eddy current. A high correlation coefficient of 0.99 shows that the electrical conductivity or the specific electrical resistance of ferromagnetic metals can be determined by means of eddy current measurement. The influence of the hysteresis curve can be disregarded on account of the at least substantially saturated metal. The influence of interference sources is minimized. The mechanical-technological characteristic variable, in particular the tensile strength, the yield strength or the hardness of the metal, is then determined on the basis of a strong, identified correlation between said mechanical-technological properties and the electrical conductivity or the specific electrical resistance of the metal. The accuracy of the measurement principle is illustrated by a high correlation of 0.99 between the eddy current signal and the tensile strength.

In order to eliminate the influence of the relative permeability, the measurement should be performed in at least substantially saturated metal. While magnetic saturation of the metal is typically assumed at flux densities of 2 T, it has been found that for the purposes of the present evaluation, a flux density of at least 1.5 T is sufficient, this being the case in particular for fine-grained construction steel, as is often used in the field of pipelines. In this respect, the metal is considered to be substantially saturated when it is saturated at least to 60%. This applies to the region in which the eddy current is formed. The eddy current, which can have penetration depths of in particular up to 3 mm for the present applications, is preferably formed in such a way that, at frequencies of the sensor apparatus of, in particular, from 100 kHz to 500 kHz, preferably from 200 kHz to 400 kHz, which are to be used, the penetration depth is less than 1 mm. As a result, wall thickness influences of the walls, which are generally between 4 mm and 40 mm thick, are avoided.

The sensor apparatus comprising a transmission coil has electronic means, which are generally associated with said coil, and can also be described as a coil system. In addition, a sensor apparatus can also have more than one coil, wherein a transmission coil and reception coil can be formed separately, but possibly also by the same coil.

The remanance effects are already sufficiently suppressed in a magnetic flux density in the ferromagnetic metal of 1.5 T. The flux density is already approximately 80% of the maximum flux density at a magnetization on of around 5 kA/m, and almost 90% is reached at 10 kA/m. In this case, the saturation is defined as the point from which an increase in the field strength no longer leads to a further reduction in noise. This applies, in particular, again for fine-grained construction steels.

The following Maxwell equation with the relevant measurement variables applies for the eddy current signal:

$$\text{rot} \vec{J}_{eddy\ current} = -i\sigma\mu\omega \vec{H}_{excitation}$$

The generated eddy current is therefore dependent on the excitation frequency $\omega$ and the material constants of the steel, specifically the electrical conductivity $\sigma$ and the magnetic relative permeability $\mu = \mu_0 \cdot \mu_{rel}$. The electrical conductivity $\sigma$ of the metal is additionally dependent on the temperature. For simplicity, the coil signal S can be illustrated as a function f of the product of the electrical conductivity, of the relative permeability and of the lift-off (LO), since said lift-off is incorporated in the excited magnetic field H(LO):

$$S(LO,T,\mu,\sigma) \sim f(\sigma(T) \cdot \mu_{rel} \cdot H(LO))$$

As shown by the above equation, the eddy current signal depends, amongst other things, on the three parameters σ, $\mu_{rel}$ and LO. Variations in these parameters lead to a change in the coil measurement signal in the 2D impedance plane. Since there are three parameters, it is clear that said parameters have to be linearly dependent in the 2D impedance plane, that is to say the three vectors of the variations cannot be perpendicular to one another and changes in a parameter vector cannot be clearly assigned to said parameter vector in some cases. In this respect, it is advantageous to keep the lift-off LO constant or to determine said lift-off LO in order to therefore be able to correct variations in a changing magnetic field on account of a lift-off of the eddy current sensor or of the sensor apparatus.

While a large number of ferromagnetic materials are saturated at a flux density of around 2 T, a flux density of 1.5 T is sufficient for the purposes of the present measurement. According to the invention, the influence of the hysteresis curve or of the μrel is removed in a substantially saturated magnetic field. The temperature and the lift-off can be considered to be interference variables. In order to improve the measurement, it is therefore advantageous to determine the temperature and/or the lift-off and/or to keep said temperature and/or said lift-off constant. The temperature can expediently be determined, in particular, in a pipeline which is kilometers long.

The sensor apparatus comprises a preferably alternating current-operated transmission coil which, at the same time, can also be in the form of a reception coil and therefore in the form of an eddy current sensor. Depending on the setup, the sensor apparatus can also have two coils which are coupled in a bridge circuit and which then likewise form the eddy current sensor. Furthermore, the sensor apparatus has means for driving and means for measuring the currents which are induced by the eddy currents and/or voltages or the phases of said voltages.

It goes without saying that the data recorded by the eddy current sensor does not directly represent the mechanical-technological characteristic variable, but rather said characteristic variable is derived, by means of the evaluation apparatus. Depending on the measurement system used, the evaluation apparatus can be connected directly to the sensor apparatus, however when an inspection device for pipelines (inspection gauge) is used, the evaluation apparatus can also be separate from the inspection device and be connected to the inspection device only for the purpose of transmitting data. It may also be advantageous to perform a first simple evaluation of the data, for example simple filtering, as early as at the inspection device and to then perform the further evaluation after downloading the data from the inspection device to the further evaluation apparatus.

An evaluation apparatus typically comprises means for communicating with the inspection device, means for temporarily storing and processing the eddy current sensor data and also further necessary data, in particular location data, which can be obtained from further sensors of the inspection device, and memory means, display means and/or output means for the results of the data evaluation. The evaluation unit likewise often has a corresponding program for evaluating the data, since the data is generally analyzed with computer assistance. By way of example, an inspection system can comprise an inspection gauge and a notebook computer which can be connected to said inspection gauge and in which the reference data can be stored and on which the eddy current sensor data and associated location data which is downloaded from the inspection gauge can be analyzed.

The eddy current is measured, in particular, close to the surface, that is to say preferably within a distance of <10 mm of a coil of the sensor apparatus from the surface of the metal to be measured. The measurement involves contactless, non-destructive determination of the eddy currents, that is to say the measurement is not adversely affected when there is a distance between sensors and the surface of the metal. For example, the eddy current sensor can be separated from the metal by means of a thin ceramic layer.

Whereas the sensor apparatus is usually in a fixed position in the prior art, provision is made in the method according to the invention for the sensor apparatus to preferably be moved within a pipeline and along the inside surface of said pipeline as a part of an inspection gauge. As a result, pipelines in which a large number of types of different materials have been used in particular can be measured and the integrity of said pipelines can be estimated more effectively.

Accordingly, it is advantageous when a plurality of the sensor apparatuses are arranged next to one another in the circumferential direction and such that they can move with respect to a longitudinal center axis in the radial direction, in such a way that the sensor apparatuses a e arranged on the inside of a metal pipeline and measure the characteristic variable of said metal pipeline in the circumferential direction or record the associated eddy current data In particular, the characteristic variable is measured in the circumferential direction by means of the number of sensor apparatuses in order to be able to redundantly identify whether adjoining pipeline pipe sections comprise different types of steel.

The sensor apparatuses are next one another in the circumferential direction when they are arranged next to one another with respect to a projection on a plane transverse to the longitudinal center axis of the gauge, which would then correspond to the longitudinal center axis of a straight pipeline. It goes without saying that redundant measurement can also be achieved with sensor apparatuses which are arranged one behind the other with respect to the longitudinal center axis.

The characteristic variable is preferably the hardness, the yield strength or the tensile strength of the material. Therefore, the corresponding variables for a large number of metals together with their electrical conductivity or specific electrical resistance are listed in the reference data. In particular, the reference database includes ferromagnetic steels, specifically preferably fine-grained ferromagnetic steels which are used in pipelines.

While it is readily possible to base the sensor apparatus comprising a transmission coil and an eddy current sensor on a single coil, that is to say to limit the coil system of the sensor apparatus to a single coil, it is particularly advantageous for the purpose of increasing the measurement accuracy when the magnetic field for generating the eddy current is generated at least by a first coil of the sensor apparatus, the sensor apparatus also comprises a further coil, and the eddy current is measured on the basis of a voltage and phase difference in a bridge circuit comprising the two coils.

The metal is preferably magnetically saturated, that is to say the flux density in the metal is around 2 T, by the magnetization apparatus in order to minimize the influence of the relative permeability.

A magnetic field which has a strength of more than 4 kA/m, preferably more than 5 kA/m, and further preferably more than 6 kA/m, in particular is generated in the metal, which is preferably composed of fine-grained steel, by the magnetization apparatus. In this case too, the region is, with respect to a hysteresis curve of the metal which is to be taken into consideration, a region in which the influence of relative permeabilities on the variables to be measured and in the above-described equations can be disregarded. Accordingly, the distance of the eddy current sensor from the surface of the metal is also either recorded and/or prespecified, in order to remove the dependency of the eddy current signal on the lift-off, that is to say the distance of the eddy current sensor from the metal. A temperature sensor can be provided for measuring the temperature, said temperature sensor being arranged, in particular, in or on a housing of the central body. The eddy current signal can then be corrected in respect of the temperature, it is independent of the temperature. The temperature sensor can also be arranged in the immediate vicinity of the sensor apparatus, in particular on an associated carrier, in order to be able to also calibrate the sensor apparatus in respect of the temperature prevailing there.

Calibration is preferably performed depending on the ambient temperature. That is to say, for the reference data, the eddy current amplitude is recorded in a temperature range of from, for example, 10 to 70° C. for various eddy current sensor metal systems for the reference data. In this case, the temperature drift of the sensor is then also taken into consideration. In order to measure the electrical conductivity, the temperature is then measured by an independent temperature sensor and the eddy current signal is shifted in accordance with the temperature curve. With respect to the dependence of the eddy current signal in the temperature range of, for example, from 10 to 70° C., there is a linear dependence between the signal from the eddy current sensor and the change in temperature. The electrical conductivity or the specific electrical resistance is determined independently of the temperature owing to the correction of the eddy current signal with respect to the temperature.

In particular, the eddy current sensor is guided at a defined distance from the wall in a resilient manner in order to minimize the influence of the lift-off on the eddy current amplitude, so that there is as little variation in the lift-off as possible.

In order to compensate for variations in the signal on account of changes in the wall thickness which are expressed in changes in the magnetization, at least one magnetic field strength sensors provided, which measures the magnetic field present in the metal close to the surface. Said magnetic field strength sensor is, for example, one or more Hall sensors. In the present case, "close to the surface" means, in particular, a distance of <10 mm from the surface.

The object set in the introductory part is likewise achieved by an inspection gauge as claimed in claim 13. According to said claim, an inspection gauge for pipeline pipes, having at least one magnetization apparatus, which is in the form of a magnet yoke, and having a sensor apparatus, which has a transmission coil, comprising an eddy current sensor has, in order to detect a mechanical-technological characteristic variable of the pipeline pipe, in particular in accordance with a method as per claims 1 to 12, an eddy current sensor, which is arranged between the poles of the magnetization apparatus, and also furthermore a magnetic field strength sensor. Said magnetic field strength sensor can advantageously be arranged between the poles of the same magnet yoke or of an adjacent magnet yoke. In this case, the strength of the magnets of the magnet yoke is high enough to magnetize the wall, which is to be examined, of the pipeline pipe at least in the region in which eddy current is intended to be generated, to such an extent that the metal is at least substantially saturated. In this case, the associated flux densities lie in the region of >1.2 T, preferably >1.5 T. Accordingly, the field strengths in metal lie in the region of preferably more than 4 kA/m, further preferably more than 5 kA/m. The inspection gauge is provided with a magnetization apparatus which can move in a direction transverse to a longitudinal center axis. The magnet poles of the magnetization apparatus can therefore bear directly against the pipeline wall and magnetize said pipeline.

Owing to this setup, it is possible, by removing the influences of a relative permeability of the material of the pipeline pipe and, in particular, also given precise knowledge of the prevailing temperatures, to derive the mechanical-technological characteristic variable from the data of the eddy current. In this case, derivation is generally performed after the data of the inspection gauge is read out or the data of the inspection gauge is transmitted to an associated evaluation apparatus. Said evaluation apparatus generally comprises EDP means and display means and/or writing means and memory means, for example a laptop computer.

The magnetization apparatus preferably comprises at least one permanent magnet, and the magnetic field strength sensor is arranged between the poles of said magnetization apparatus or a further, adjacent magnetization apparatus. The use of permanent magnets also ensures a sufficient degree of magnetization for relatively long inspection runs, without energy also having to be transported on the gauge for solenoids. The measurement of the magnetic field strength between the poles is more accurate since the magnetic field strength of the wall of the pipeline generally falls to a great extent after the magnetization apparatus of the inspection gauge passes through.

The sensor apparatus is preferably arranged on a sensor support which, when force is applied, can move in the radial direction in relation to a longitudinal axis of the inspection gauge. Said sensor support is in particular, a magnet yoke which is mounted such that it can move in the radial direction and on which the sensor support or the sensor apparatus or at least the eddy current sensor can additionally be pushed outward in the radial direction and so as to butt against the pipe separately, when force is applied, by means of for example, a force-storage element in the form of a spring. Therefore, the lift-off of the sensor apparatus from the pipeline wall on account of the lift-off of the magnet poles of the magnet yoke on account of, for example, welded seams is prevented. The sensor support for the eddy current sensor remains directly on the pipe wall. In order to protect the sensor support, said sensor support, the sensor apparatus or at least the eddy current sensor can be provided with a ceramic layer which can be renewed given sufficiently high abrasion phenomena.

Guiding the sensor support to the pipeline wall firstly by the magnet yokes, which are drawn to the pipeline wall in a spring-loaded manner or are not already drawn to the pipeline wall on account of the magnetic attraction forces, and also the separate guidance or mounting of the eddy current sensor in relation to the magnet yoke or the sensor support when force is applied lead to optimum guidance of the eddy current sensor on the surface of the pipe.

The inspection gauge is preferably provided with a large number of sensor apparatuses which are arranged next to one another in the circumferential direction and which can be arranged between the poles of the associated magnet yokes.

The sensor apparatus preferably has in each case three eddy current sensors which comprise two coils, wherein each eddy current sensor is designed for a different frequency or can be operated at a different frequency. This serves to generate redundant results.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Individual technical features of the exemplary embodiments described below can also be combined in combination with the above-described exemplary embodiments and also the features of the independent claims and of any further claims to form subjects according to the invention.

Figure 1:
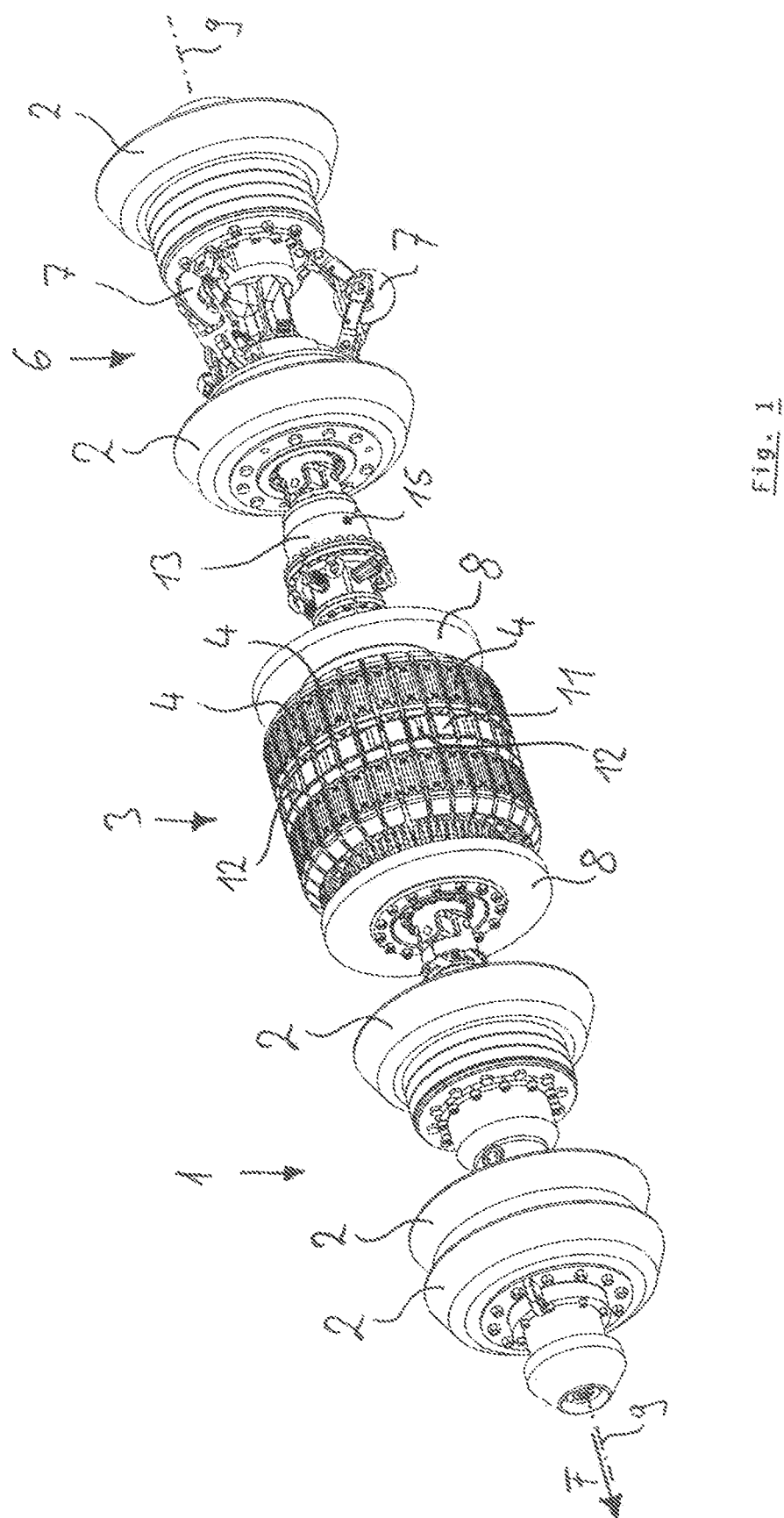
FIG. 1 schematically shows a subject matter according to the invention.

An inspection gauge according to the invention is designed for pipeline pipes according to FIG. 1, by way of example comprising three modules. A first module 1 with a series of cups 2 is coupled to a measurement unit 3 in an articulated manner as a traction unit in the direction F of travel. The measurement unit 3 has a large number of magnetization apparatuses which are arranged next to one another in the circumferential direction and are in the form of a magnet yoke 4. A module 6 which is dedicated essentially to propulsion and which, in order to determine the distance covered in the pipeline, has running rollers 7 which record said distance, is in turn provided at the rear end of the inspection gauge. The module 6 likewise has cups 2.

The central measurement unit 3 for measuring the mechanical-technological variables of the pipeline pipe material has a design with two disks 8 which are preferably produced from polyurethane. Said disks do not have a preferred direction, and therefore the module 3 could be used both in direction F and also in the opposite direction. A large number of magnet yokes 4 together with associated measurement apparatuses are arranged around a longitudinal center axis 9 of the inspection gauge in the circumferential direction. Said magnet yokes are, firstly, sensor apparatuses 11 for eddy current measurement. Secondly, magnetic field strength sensors 12 are arranged on yokes 4 which are adjacent to a sensor apparatus 11. The magnet yokes 4 can in this case be arranged such that they can move transverse to the longitudinal center axis 9, so that they can compensate for changes in the pipe inside diameter in the radial direction. Furthermore, the sensor supports, which support the sensor apparatuses 11 and/or the magnetic field strength sensors 12, can likewise additionally be arranged on the respective magnet yoke such that they can move in the radial direction and, in particular, when force is applied, in order to be able to assume an optimum position on the pipeline inner wall.

Means for receiving and storing the data which is recorded by the sensors of said central module and also for supplying energy are provided in a hollow housing part 13 of the measurement unit 3. Furthermore, a temperature sensor 15 can be arranged on the housing 13 in order to correct or be able to correct the eddy current signal in respect of the temperature.

Figure 2:
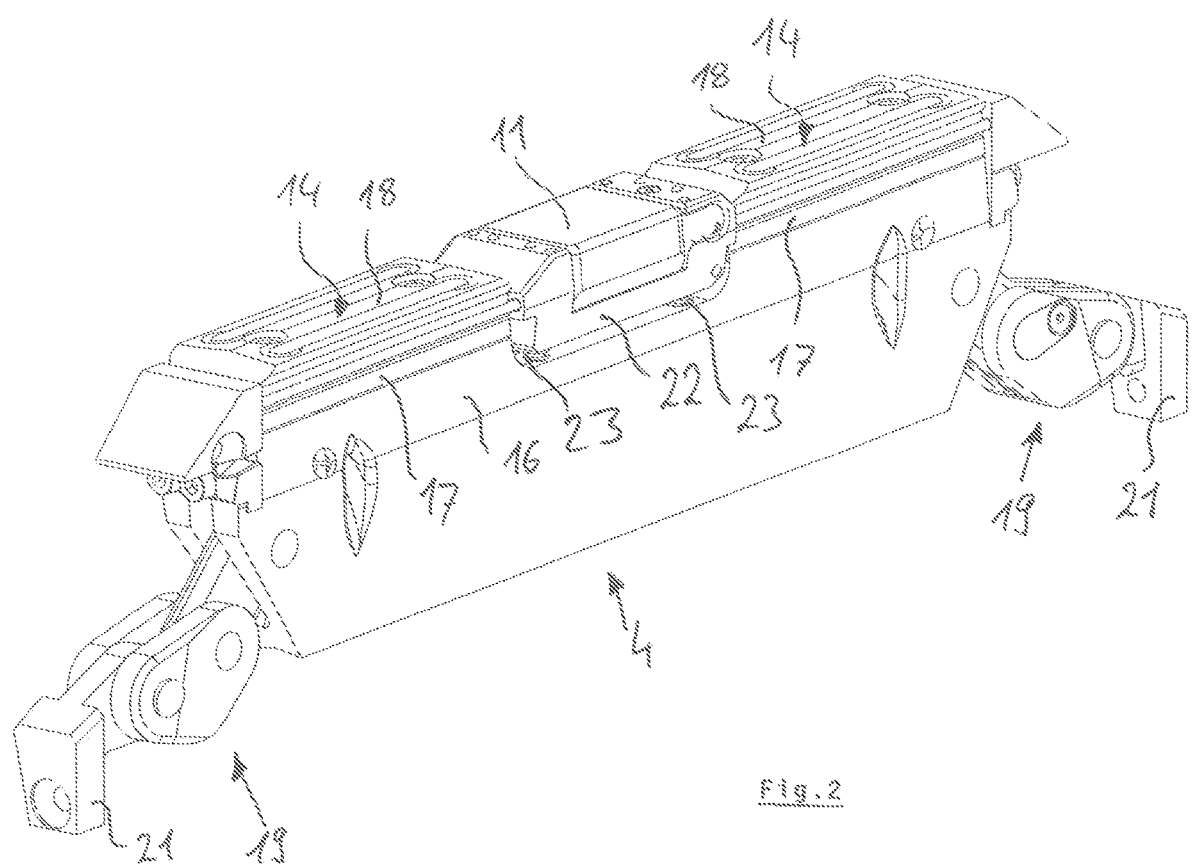
FIG. 2 schematically shows a view of a detail of the subject matter according to FIG. 1.

According to FIG. 2, each magnet yoke 4 has two magnet poles 14 which are connected to one another by means of an iron plate 16. Magnets in the form of permanent magnets 17 are attached to said iron plate and, in turn, can bear against the inner wall of a pipeline by means of brushes or similar bearing means 18. The bearing means 18 also form the poles. The entire yoke 4 is arranged such that it can move in the radial direction on account of two double-axle articulated joints 19. Flanges 21 serve to secure said yoke to the further gauge body.

Figure 3:
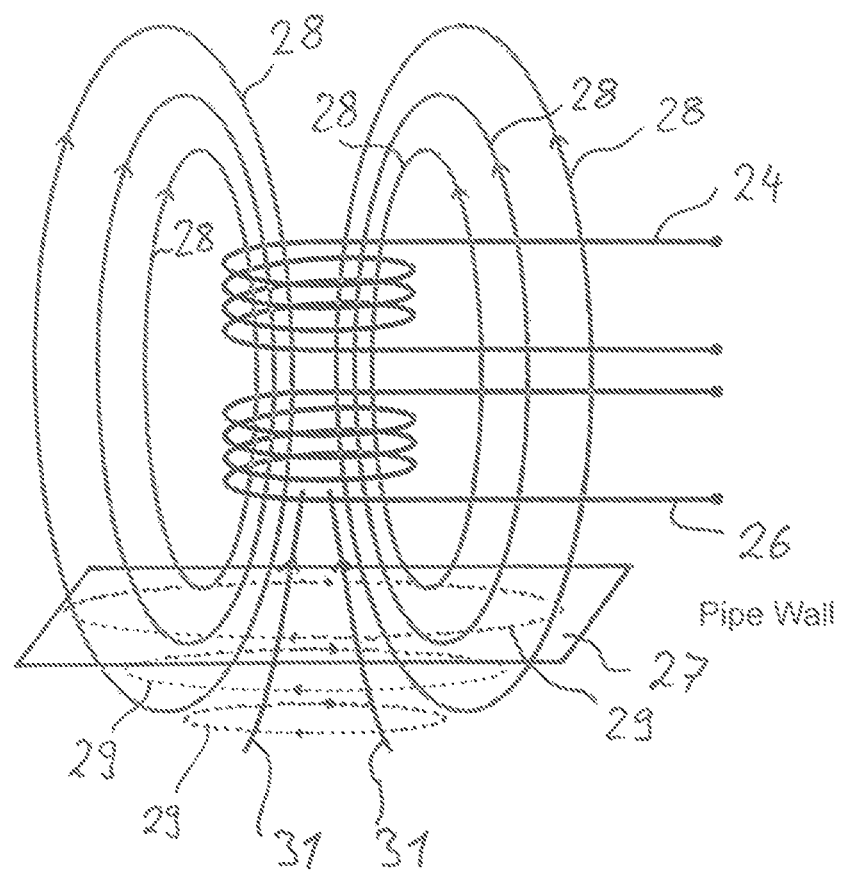
FIG. 3 schematically shows a diagram of a sensor apparatus.

In the magnet yoke 4 shown in FIG. 2, a sensor apparatus 11 is arranged between the two poles 14. An associated sensor support 22 is arranged such that it can move likewise in the radial direction in relation to the longitudinal center axis 9, by means of a total of four force-storage elements 23 which are arranged in the corners of the sensor support 22 and are in the form of springs. On account of the springs 23, the sensor support 22, together with the sensor apparatus 11, is pressed tightly against the pipeline wall. In this way, unevennesses over which the magnet poles 14 slide away can additionally be compensated for, and there is no lift-off of the sensor support which would lead to variations in the data A schematic illustration of the eddy current generation process is shown in FIG. 3. In this case, an eddy current sensor is provided with two coils 24 and 26 which are guided tightly against the inside surface 27 of the pipeline wall and of which at least the coil 24 is in the form of a transmission coil.

Figure 4:
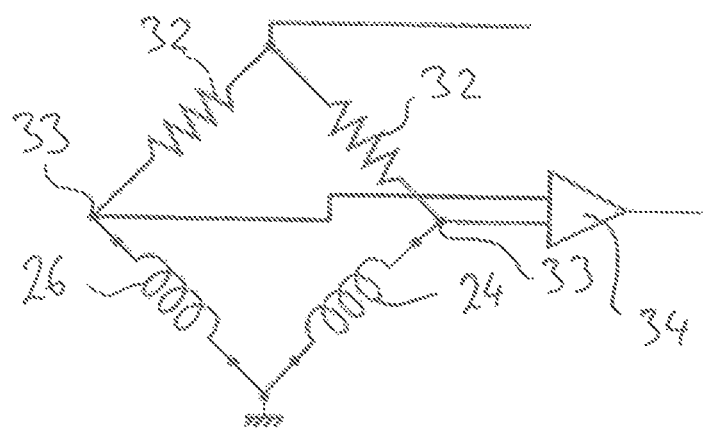
FIG. 4 schematically shows a circuit diagram for a subject matter according to FIG. 3.

The coils 24, 26 are preferably arranged one above the other or one below the other, that is to say one behind the other in a direction perpendicular to the surface, with respect to the pipeline wall 27. A primary magnetic field, illustrated by the lines 28, is generated through the coils 24, 25 by means of an alternating current. On account of this magnetic field which varies over time, eddy currents, which are illustrated using dashed lines 29 in the present case, are generated in the pipeline wall in connect on with the magnetic field which is generated by the magnetization apparatus. Said eddy currents in turn generate a secondary magnetic field, identified by field lines 31. The secondary magnetic field leads to induction in the coils 24 and 26, it being possible for this to be measured by means of a circuit which is shown in FIG. 4. The coils 24 and 26 are connected to resistors 32 to form a bridge circuit, wherein a voltage can be tapped off between the bridge points 33, it being possible for said voltage to be amplified by an amplifier 34 and said voltage being supplied to a phase-sensitive evaluation means.

Figure 5:
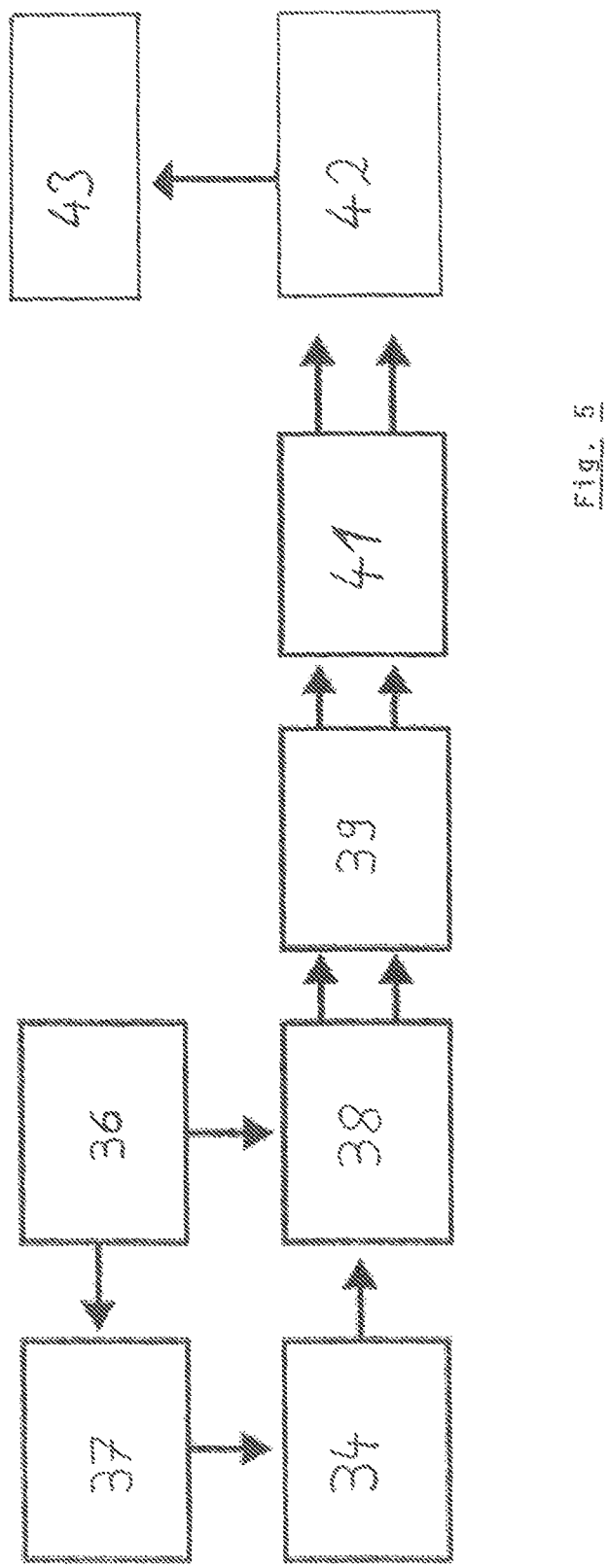
FIG. 5 schematically shows a flowchart for the evaluation of a measurement by a subject matter according to FIG. 3.

The evaluation can preferably be performed in accordance with the flowchart according to FIG. 5 in accordance with which a frequency generator 36 drives the bridge circuit 37.

The voltage tapped off there is supplied to a phase-sensitive detector 38 by means of an amplifier 34. The signal which is evaluated there can be processed further in a phase-rotated manner (evaluation module 39) or in a manner directly amplified by means of an amplifier 41. The signal can then be stored in a storage means 42, possibly output, and evaluated for any changes in an evaluation unit 43.

The alternating current-operated coils 24, 26 are characterized by two electrical impedance variables, the inductive reactance $X=2\pi fL=\omega L$ (f: frequency of the excitation, L: inductance) and the non-reactive resistance R, which inductive reactance and non-reactive resistance give the impedance $Z=\sqrt{(R^2+X^2)}$. For the purpose of illustration in a 2-D impedance plane, the reactance is plotted on the ordinate and the non-reactive resistance is plotted on the abscissa, in each case in standardized form. In air, the eddy current sensor measures a specific point in the impedance plane, this point shifting to a further point in the plane when the sensor is located on the test object. The influence of the test object can therefore be described as a change in the coil characteristics. In this case, the magnitude and direction of the change independence depends, as described above, on the material properties, in particular on the electrical conductivity and the magnetic permeability of the test object. Furthermore, the distance of the coil from the object under test is also relevant. The transformation in the high saturation of the material to be measured, which high saturation prevails substantially in the inside pipeline wall which is close to the surface, and also in the constant distance of the coil from the object under test (pipeline wall) results in changes in the impedance plane on account of changes in the electrical conductivity, said changes then, in turn, being associated with the mechanical-technological variables which a e actually to be measured.

Figure 6:
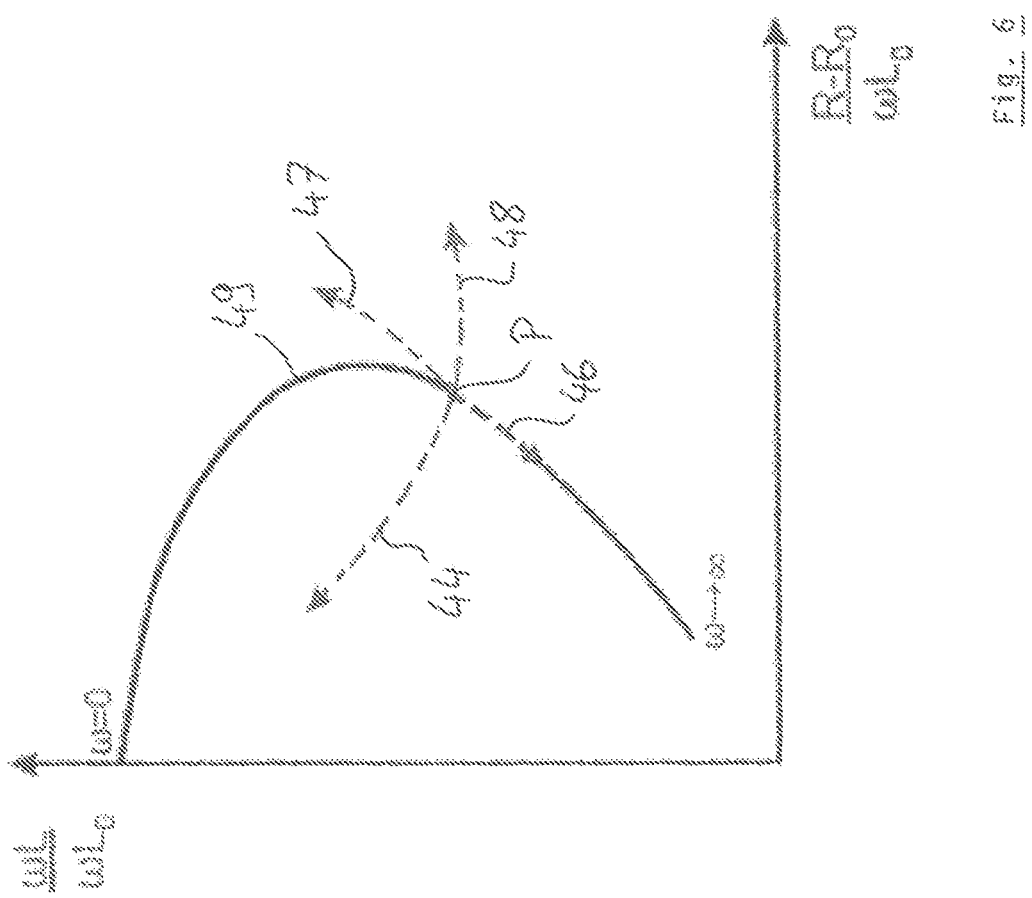
FIG. 6 schematically shows an illustration of the 2D impedance plane.

FIG. 6 shows how the different influencing factors are expressed in a standardized impedance plane. In this case, $\omega L$ is the imaginary component of the measurement in the sample, $\omega L_0$ is the imaginary component of the measurement in air, R is the real component of the measurement on the sample, and $R_O$=the real component of the measurement in air.

A change in the lift-off starting from a point P in the impedance plane leads to shifts in the direction of arrow 44, changes in the conductivity σ lead to a change along arrow 46, changes in permeability lead to changes in the direction of arrow 47, and changes in wall thickness lead to changes according to arrow 48. In this case, ω is to be understood as the excitation frequency of the sensor apparatus. Changes in wall thickness are observed and/or precluded by means of the Hall sensor by means of changes in the magnetization of the wall, a change in the signal in direction 47 is precluded by the magnetization to virtual saturation, and the lift-off in direction 44 is likewise precluded, and therefore the changes on the curve should result only on account of changes in conductivity.

Figure 7:
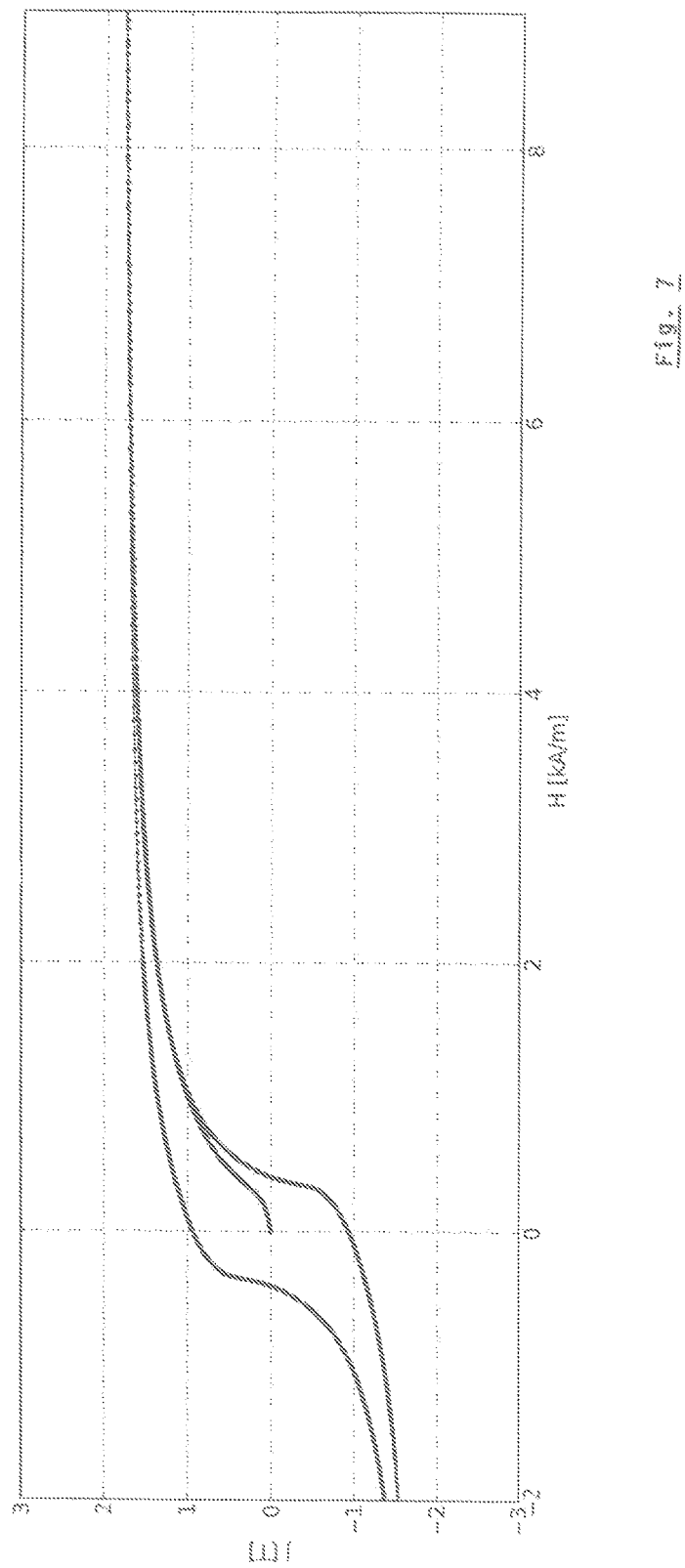
FIG. 7 schematically shows a hysteresis curve for a ferromagnetic metal.
Figure 8:
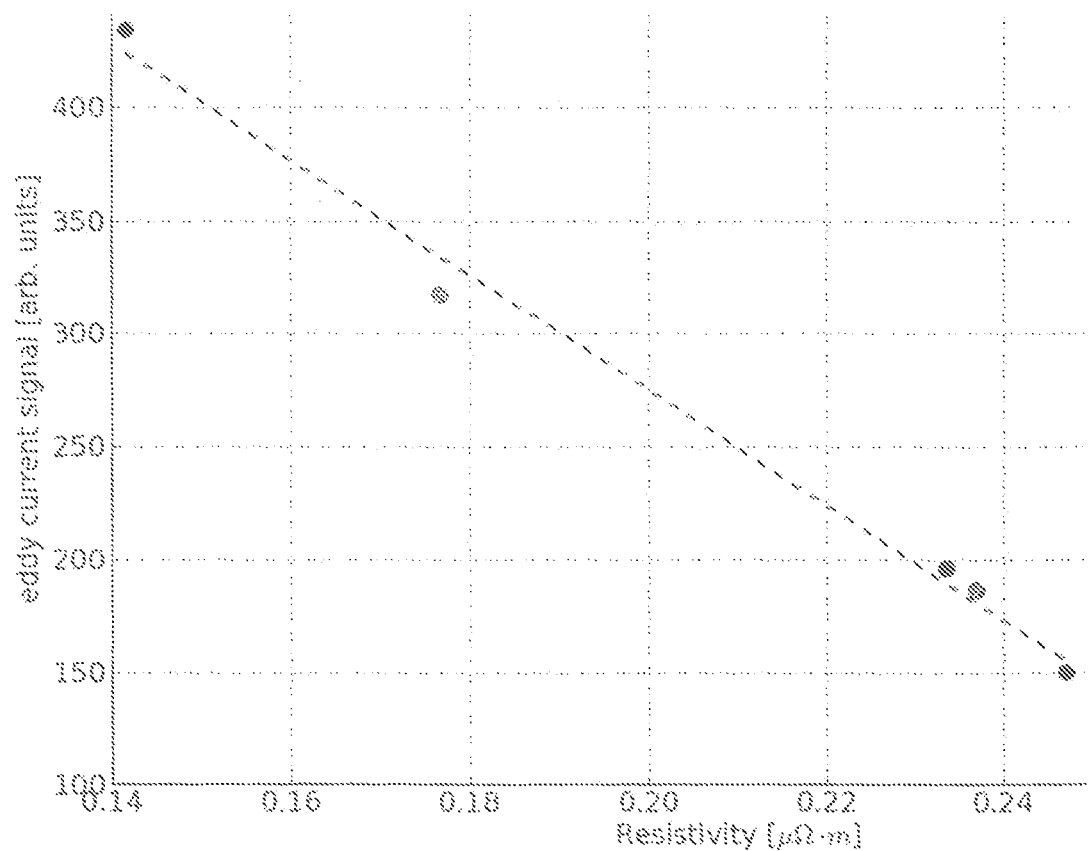
FIGS. 8 to 11 show graphs of measurement results and ascertained relationships.

In order to neutralize the influence of the relative permeability during the conductivity measurement as described above, the eddy current signal is preferably recorded at a saturation magnetization of >5 kA/m. FIG. 7 shows, by way of example, a hysteresis curve for a steel which is often used in the field of pipelines. Magnetic flux densities starting from as low as around 1.5 T may be sufficient in order to not significantly corrupt the measurement result. In the case of a few metals, even flux densities starting from 1.2 T may be sufficient. At saturation magnetization, the values for the relative permeability are in the range of from 220 to 235, preferably of from 225 to 233, for, in particular, the types of steel which can be taken into consideration in the field of pipelines. In accordance with the above, comprehensive experiments have shown that the measured eddy currents (y-axis "eddy current signal [arbitrary units]" can be represented as a linear function of the specific electrical resistance. The same applies for the conductivity which is reciprocal to the specific electrical resistance. A high correlation with a correlation coefficient of 0.99 has been found for the types of steel which can be taken into consideration from the field of pipelines.

Figure 9:
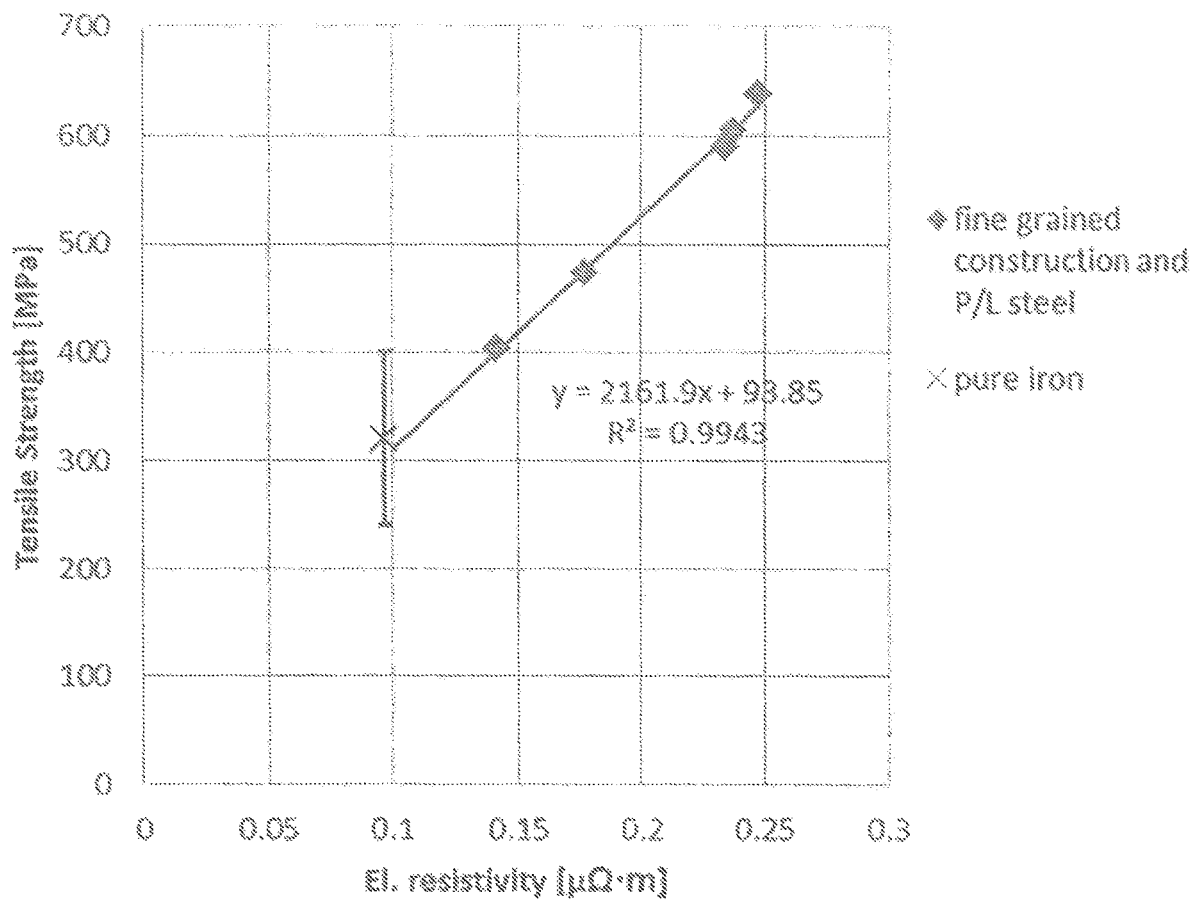
Figure 10:
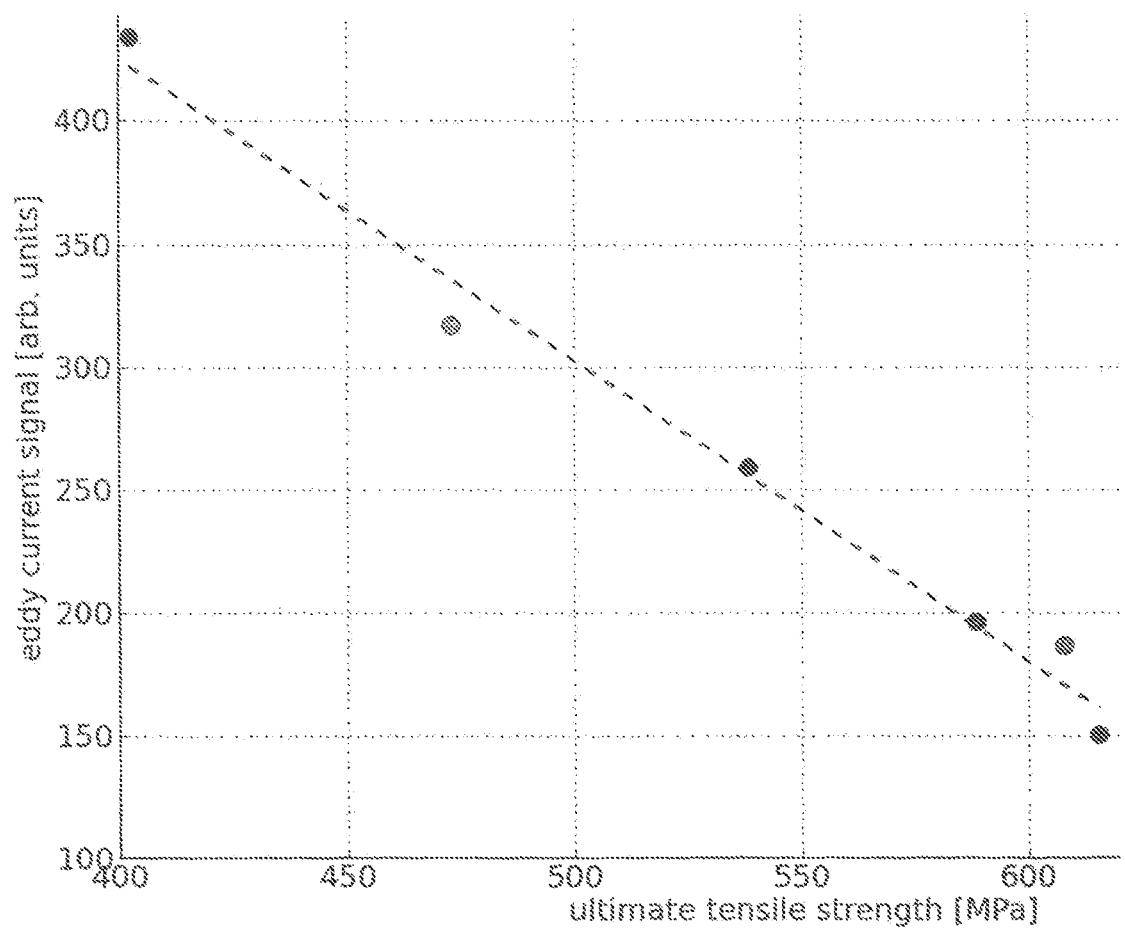
Figure 11:
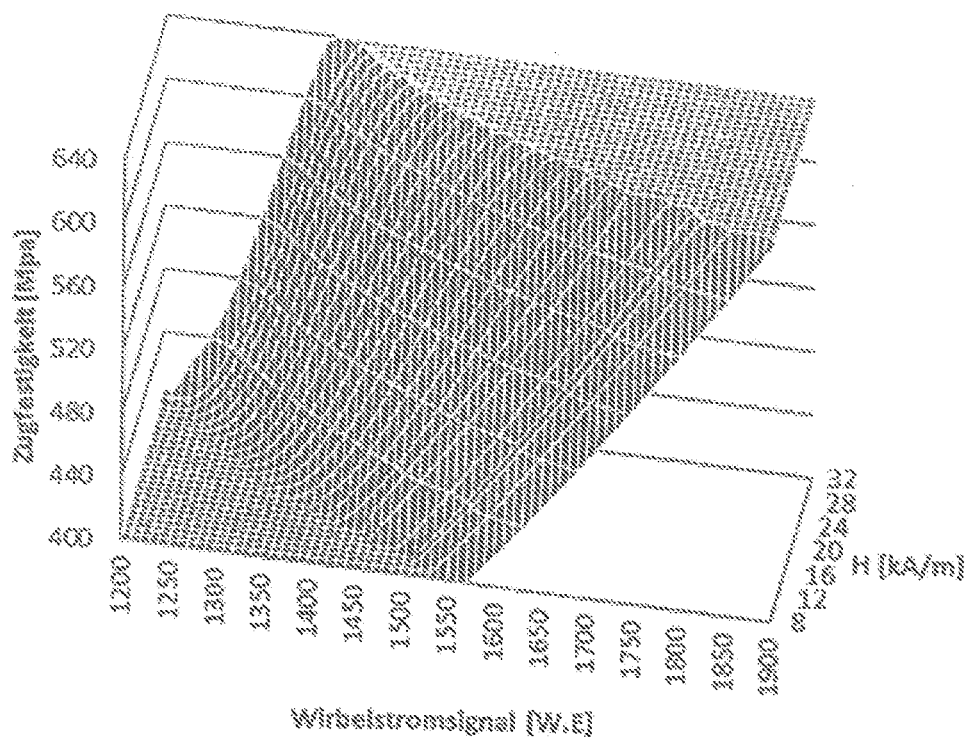

The dependency of mechanical-technological characteristic variables, such as the tensile strength which is shown in FIG. 9 for example, have been correlated with the specific resistance by means of further experiments. The corresponding data relating to a large number of possible and used materials from the field of pipelines are stored in a database which then contains the reference data. Accordingly, the tensile strength can then be plotted directly against the eddy current signal (FIG. 10). From this data, a characteristic map for directly determining the tensile strength can be generated from the two measured values of the eddy current signal and the magnetic field strength (FIG. 11).

It has therefore been shown that the sensor apparatus can be moved within inspection gauge, records eddy current signals there, the electrical conductivity and/or the specific electrical resistance of the metal is ascertained from said electrical conductivity and/or specific resistance, and the characteristic variable of the metal is then derived from this variable. As a result, the materials of pipelines which were laid decades ago can be determined.

Owing to the large number of magnetization and sensor apparatuses which are arranged around the longitudinal axis of the inspection gauge in the circumferential direction, faults owing to defects in the metal can be reliably precluded. In particular, adjoining pipe sections comprising different fine-grained steels can therefore be identified and be found over the distance covered in the pipe and ascertained by the inspection device.

The invention claimed is:

1. A method for determining a mechanical-technological characteristic variable of ferromagnetic metal walls comprising the steps of:
   magnetizing a metal wall that is to be determined, thereby creating a first magnetic field in the metal wall and at least substantially magnetically saturating a region of the metal wall, with a magnetization apparatus which has at least one permanent magnet or solenoid;
   generating a second magnetic field via a sensor apparatus comprising a transmission coil operating at frequencies of about 100 kHz to 500 kHz, said second magnetic field interacting with the first magnetic field which is generated in the metal wall by the magnetization apparatus, wherein said interaction generates an eddy current in the at least substantially magnetically saturated region of the metal wall, wherein a penetration depth of the eddy current in the metal wall is about 1 millimeter or less thereby avoiding influences from a thickness of the metal wall;
   measuring the eddy current by two or more eddy current sensors of the sensor apparatus, wherein each of the two or more eddy current sensors are arranged on a common sensor support and measure the eddy current at different respective frequencies within 100 kHz to 500 kHz so as to generate redundant data with respect to the eddy current;
   measuring a strength of the magnetic fields with a magnetic field strength sensor;

ascertaining an electrical conductivity or a specific electrical resistance of the metal wall from the redundant data from the plurality of eddy current sensors on the basis of reference data via an evaluation apparatus; and deriving, via the evaluation apparatus, the characteristic variable of the metal wall from the conductivity or the resistance;

wherein the characteristic variable is at least one of hardness, yield strength and tensile strength.

2. The method of claim 1 wherein the two or more eddy current sensors comprise three eddy current sensors.

3. The method as claimed in claim 1, further including the step of moving the sensor apparatus within a pipeline and along the inside surface of said pipeline as part of an inspection gauge.

4. The method as claimed in claim 3, further including the step of recording data with a plurality of the sensor apparatuses for detecting the characteristic variable of the pipeline wall in the circumferential direction around a longitudinal center axis of the inspection gauge.

5. The method of claim 1 wherein the metal wall is magnetically saturated by the magnetization apparatus in order to minimize the influence of the relative permeability.

6. The method of claim 1 wherein the evaluation apparatus accesses a reference database in which the electrical conductivity and/or the specific electrical resistance of various metals together with their mechanical-technological characteristic variables, in particular comprising at least the tensile strength, the yield strength and/or the hardness, are stored.

* * * * *